US012709929B2

(12) United States Patent
Wegner et al.

(10) Patent No.: US 12,709,929 B2
(45) Date of Patent: Aug. 18, 2026

(54) MOTORIZED VEHICLE DOOR TRACK ASSEMBLY FOR A SLIDING DOOR AND METHOD OF ASSEMBLY THEREOF

(71) Applicant: The Braun Corporation, Winamac, IN (US)

(72) Inventors: Christopher C. Wegner, Winamac, IN (US); Nate L. Martindale, Star City, IN (US)

(73) Assignee: The Braun Corporation, Winamac, IN (US)

( * ) Notice: Subject to any disclaimer, the term of this patent is extended or adjusted under 35 U.S.C. 154(b) by 687 days.

(21) Appl. No.: 18/179,143

(22) Filed: Mar. 6, 2023

(65) Prior Publication Data

US 2023/0287721 A1 Sep. 14, 2023

Related U.S. Application Data

(60) Provisional application No. 63/318,513, filed on Mar. 10, 2022.

(51) Int. Cl.

| | |
|---|---|
| ***E05D 15/10*** | (2006.01) |
| ***B60J 5/06*** | (2006.01) |
| ***E05D 15/06*** | (2006.01) |

(52) U.S. Cl.

CPC .............. *E05D 15/101* (2013.01); *B60J 5/06* (2013.01); *E05D 15/0652* (2013.01);

(Continued)

(58) Field of Classification Search

CPC .............. E05D 15/101; E05D 15/0652; E05D 15/0656; E05D 15/0686; E05D 15/0691;

(Continued)

(56) References Cited

U.S. PATENT DOCUMENTS 6,006,814 A * 12/1999 Dalpe .................. E06B 3/9632 160/116
6,328,374 B1 * 12/2001 Patel .......................... B60J 5/06 49/213

(Continued)

FOREIGN PATENT DOCUMENTS

| | | |
|---|---|---|
| DE | 10300158 | 3/2004 |
| DE | 102004033759 A1 | 2/2006 |
| GB | 295138 A | 8/1928 |

OTHER PUBLICATIONS

International Search Report and Written Opinion for PCT/US2023/063790, Aug. 9, 2023, 10 pages, International Searching Authority for the European Patent Office.

(Continued)

*Primary Examiner* — Justin B Rephann
(74) *Attorney, Agent, or Firm* — Daniel Tallitsch; Tyler Schultz

(57) ABSTRACT

A door track assembly along which a vehicle door travels between an open position and a closed position is provided. The door track assembly includes a first track portion defining a first track surface, a second track portion, and a third track portion coupled to the second track portion. The third track portion includes a top wall, a first side wall, a second side wall, and a lower wall, where the lower wall defines a second track surface. The first track portion defines at least a first finger and a first groove in the first track surface, and the third track portion defines at least a second finger and a second groove in the second track surface. The first finger is disposable within the second groove and the second finger is disposable within the first groove such that the first track surface and second track surface are substantially coplanar.

16 Claims, 12 Drawing Sheets

(52) U.S. Cl.
CPC ..... *E05D 15/0656* (2013.01); *E05D 15/0686* (2013.01); *E05D 15/0691* (2013.01); *E05Y 2600/56* (2013.01); *E05Y 2900/531* (2013.01)

(58) Field of Classification Search
CPC ..... B60J 5/06; B60J 5/04; B60J 5/0401; B60J 5/0412; B60J 5/047; E05Y 2201/684
See application file for complete search history.

(56) References Cited

U.S. PATENT DOCUMENTS 7,621,586 B2 * 11/2009 Fischer ...................... B60J 5/06 296/155
8,794,688 B2 * 8/2014 Mather ...................... B60J 5/06 296/78.1
11,686,142 B2 * 6/2023 Griswold ............. E05F 17/004 49/70
12,257,886 B2 * 3/2025 Pugh .......................... B60J 5/06
2009/0199480 A1 * 8/2009 Ehrhard ............. B60R 13/0243 49/413
2009/0230722 A1 * 9/2009 Krajenke ............. E05D 15/101 296/146.5
2009/0267383 A1 * 10/2009 Fischer ............... E05D 15/1047 296/155
2010/0031577 A1 * 2/2010 Haab .................. E05D 15/0652 49/449
2012/0297684 A1 * 11/2012 Bresson .................. E05F 15/70 29/525.08
2013/0186002 A1 * 7/2013 Mather ...................... B60J 5/06 49/404
2018/0216388 A1 * 8/2018 Krupke .................. E05F 15/70
2022/0195773 A1 6/2022 Bettcher, III et al.
2022/0268069 A1 * 8/2022 Pugh ..................... E05D 15/165
2023/0279714 A1 * 9/2023 Griswold ................ E05F 15/60 49/70

OTHER PUBLICATIONS

Invitation to Pay Additional Fees and, Where Applicable, Protest Fee for PCT/US2023/063790, Mar. 6, 2023, 10 pages, International Searching Authority for the European Patent Office.

* cited by examiner

MOTORIZED VEHICLE DOOR TRACK ASSEMBLY FOR A SLIDING DOOR AND METHOD OF ASSEMBLY THEREOF

CROSS REFERENCE TO RELATED APPLICATIONS

This application claims priority to U.S. Provisional Patent Application No. 63/318,513, filed on Mar. 10, 2022, the disclosure of which is incorporated herein by reference.

FIELD OF THE DISCLOSURE

The present disclosure relates to a motorized vehicle, and more particularly to a motorized vehicle capable of transporting one or more physically limited passengers.

BACKGROUND

Automobile manufacturers do not currently mass-produce passenger vehicles specifically designed to transport passengers having physical limitations, either as a driver or a passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration, a van may be retrofitted with a ramp to enable a physically limited individual using a wheelchair to enter the vehicle without the assistance of another individual.

Other known level change devices for retrofitting a vehicle, such as a van, include wheelchair lifts, lift platforms, and lowered floor surfaces. In some instances, a door of an original equipment manufacturer (OEM) van may be enlarged or otherwise modified to permit entry of the physically limited individual through what is known as the assisted entrance. Once inside the vehicle, individuals may operate the vehicle as a vehicle operator or occupy locations designated for passengers. This may include, but is not limited to, a front passenger location or rear passenger locations.

Many motorized vehicles modified to include a ramp or lift for transporting physically limited passengers are passenger vans or buses. Minivans, or passenger vans, are often referred to as multi-purpose vehicles (MPVs), people movers, or multi-utility vehicles. At least in the United States, minivans are classified as light trucks or MPVs. In many instances, these vans have rear access doors on each side thereof that, when opened, define a door opening that can provide easy ingress and egress of a wheelchair.

Crossover and sport-utility vehicles have become popular due to their style and driving performance. Sport-utility vehicles are built off a light-truck chassis similar to passenger vans, whereas crossover or crossover utility vehicles are built from a passenger car chassis. Due to their build, crossover vehicles are often more fuel efficient than heavier, sport-utility vehicles and include other advantages over minivans and sport-utility vehicles. The modified vehicles are often diesel or gasoline-powered.

SUMMARY OF THE EMBODIMENTS

In one embodiment of the present disclosure, a door track assembly along which a vehicle door of a motorized vehicle travels between an open position and a closed position is provided. The vehicle door may include a door mechanism assembly having a cable and at least one wheel. The door track assembly may include a first track portion defining a first track surface, a second track portion comprising at least a first wall and a second wall, and a third track portion coupled to the second track portion. The third track portion may include a top wall, a first side wall, a second side wall, and a lower wall, where the lower wall defines a second track surface. The first track portion may define at least a first finger and a first groove in the first track surface, and the third track portion may define at least a second finger and a second groove in the second track surface. The first finger may be disposed within the second groove and the second finger may be disposed within the first groove such that the first track surface and second track surface may be substantially coplanar.

In one aspect of this embodiment, the third track portion may include a third finger, wherein the first finger may be disposed inbetween the second finger and third finger. In another aspect, the third track portion may be welded to the second track portion. In a further aspect, the top wall may be arranged substantially coplanar with the second wall, and the first side wall may be arranged substantially coplanar with the first wall. In yet another aspect, the top wall, the first side wall and second side wall may define a channel, where the channel is adapted to receive the at least one wheel. In yet a further aspect, a bracket may be coupled to the third track portion, the bracket including a first portion, a second portion and a third portion. In a different aspect, the first portion may be disposed within a first plane, the second portion may be disposed within a second plane, and the third portion may be disposed within a third plane, where the first plane, second plane and third plane may be substantially perpendicular to one another.

In a further aspect of this embodiment, the second portion may define a first opening, a second opening, and a slot, where the first opening may be larger than the second opening, and the slot may be located between the first and second openings. In another aspect, the second opening may be adapted to receive the cable. In yet a further aspect, the bracket may define an opening in the third portion, and the third track portion may include a first track extension portion and a second track extension portion, the first track extension portion defining a first opening and the second track extension portion defining a second opening, where the first opening, second opening and the opening in the bracket may be aligned when coupling the bracket to the third track portion. In yet another aspect, the second finger and second groove may be formed in the first track extension portion.

In another embodiment of the present disclosure, a door mechanism assembly of a vehicle door for travelling in a door track of a motorized vehicle is provided. The door mechanism assembly may include a slider mechanism having a body portion and a wheel, the body portion defining an elongated slot having a length defined between a first end and a second end. A door mount assembly may be adapted to being coupled to the vehicle door. The door mount assembly may include a body mount portion coupled to the slider mechanism. At least one pin may couple the door mount assembly to the slider mechanism such that the at least one pin may be disposed within the slot. The wheel may be configured to being received in and moving along the door track as the vehicle door moves between a closed position and an open position, and the at least one pin may move to the second end of the slot in the open position.

In one aspect of this embodiment, the at least one pin may be located at the first end of the slot in the closed position. In another aspect, as the wheel travels from the closed position, the at least one pin may be located a distance from the second end of the slot. Here, the wheel may be adapted to engage an end stop in the vehicle track, and upon engaging the end stop, the door mount assembly and the at least pin may continue moving in the slot until the at least one pin contacts the second end of the slot. In a further aspect, the slider mechanism may include a flange portion, where the body portion may be defined in a first plane and the flange portion may be defined in a second plane such that the first plane and second plane may not be parallel to or coplanar with one another.

In a further embodiment of the present disclosure, a motorized vehicle may include a chassis, a plurality of wheels supporting the chassis, a plurality of tracks coupled to the chassis including at least a first track assembly and a second track assembly, and a vehicle door coupled to the chassis. The vehicle door may be adapted to move between a closed position and an open position, wherein the vehicle door may include a first door mechanism assembly movably coupled to the first track assembly and a second door mechanism assembly movably coupled to the second track assembly. The first vehicle track assembly may include a first track portion defining a first track surface, a second track portion, and a third track portion coupled to the second track portion. Here, the third track portion may include a top wall, a first side wall, a second side wall, and a lower wall, where the lower wall may define a second track surface. The first track portion may define at least a first finger and a first groove in the first track surface, and the third track portion may define at least a second finger and a second groove in the second track surface. The first finger may be disposed within the second groove and the second finger may be disposed within the first groove such that the first track surface and second track surface are substantially coplanar.

In one aspect of this embodiment, the second door mechanism assembly may include a slider mechanism comprising a body portion and a wheel, where the body portion may define an elongated slot having a length defined between a first end and a second end. A door mount assembly may be adapted to being coupled to the vehicle door, and the door mount assembly may include a body mount portion coupled to the slider mechanism. At least one pin may couple the door mount assembly to the slider mechanism as the at least one pin may be disposed within the slot. Here, the wheel may be configured to being received in and moving along the door track as the vehicle door moves between a closed position and an open position, and the at least one pin may move to the second end of the slot in the open position.

In another aspect, as the vehicle door is moved from its closed position to its open position, the wheel of the slider mechanism may move along the second track assembly until it reaches a stop, where when the wheel reaches the stop the first door mechanism may be located at the end of the first track surface. Upon reaching the stop, the first door mechanism may move along the second track surface and the at least one pin may move within the slot until it contacts the second end. In a further aspect, the third track portion may be welded to the second track portion. In yet another aspect, a bracket may be coupled to the third track portion. Here, the bracket may include a first portion, a second portion and a third portion, where the second portion defines a first opening, a second opening, and a slot. The first opening may be larger than the second opening, and the slot may be located between the first and second openings. The second opening may be adapted to receive an end of a cable coupled to the vehicle door.

BRIEF DESCRIPTION OF DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

DETAILED DESCRIPTION OF THE EMBODIMENTS

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
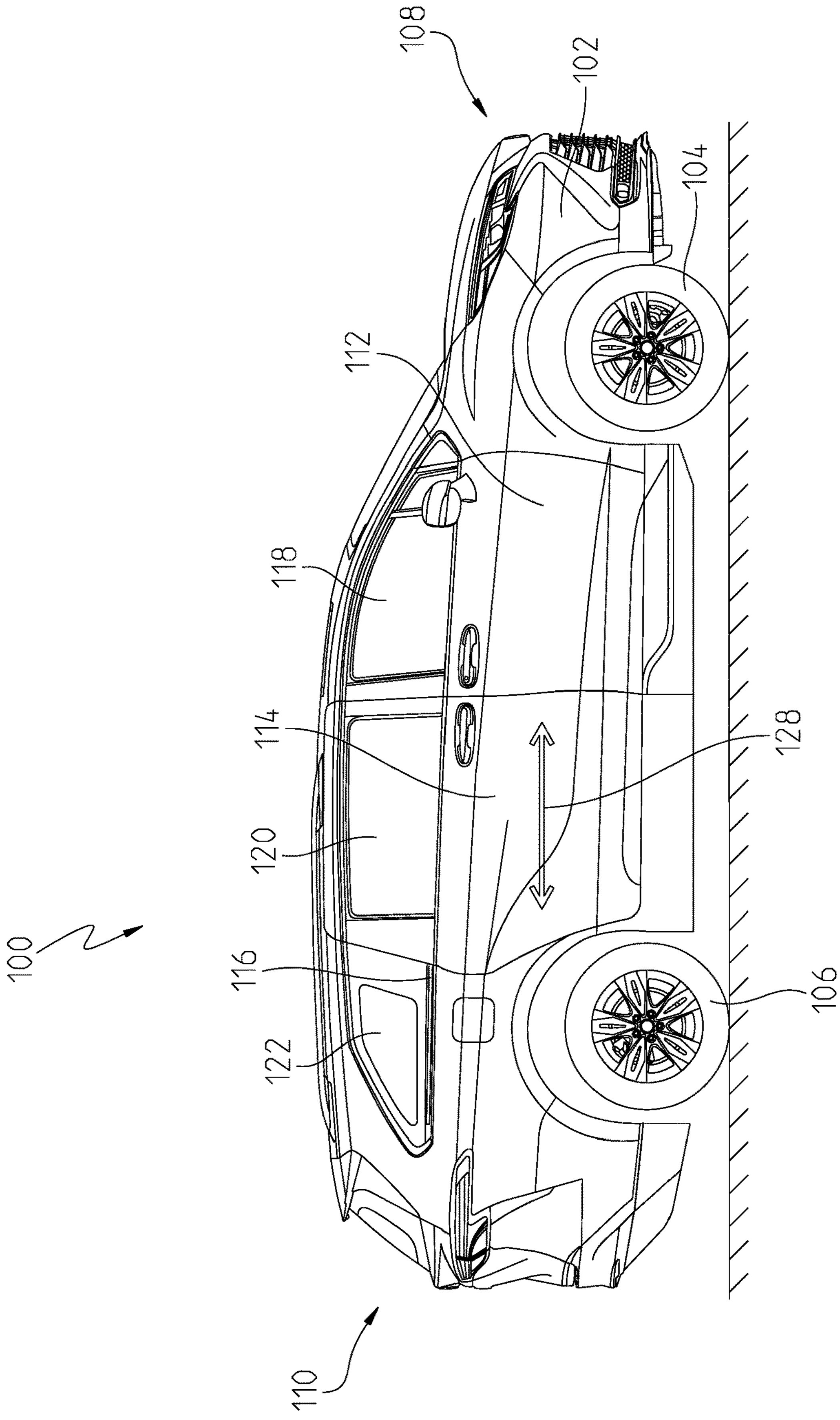
FIG. 1 is a side view of a motorized vehicle.

FIG. 1 illustrates an embodiment of a motorized vehicle 100 available from any number of United States and foreign manufacturers. In the illustrated embodiment, the vehicle 100 may a unibody construction. Other vehicles, however, contemplated within this disclosure may include a frame on body construction. Consequently, the use of the motorized vehicle herein includes all types and kinds of vehicles constructed with a body on frame construction, a unibody construction, or other constructions.

As shown in FIG. 1, the vehicle 100 may include a vehicle body or chassis 102 operatively coupled to front wheels 104 and rear wheels 106 which support the vehicle 100 as it traverses the ground. The front wheels 104 may define a front axle and the rear wheels 106 may define a rear axle of the vehicle 100. In one embodiment, the vehicle 100 may include a unibody construction designed off of a truck chassis. In another embodiment, the vehicle body 102 may also define a body or vehicle axis through the center of the vehicle 100. The body axis may be defined along the length of the vehicle 100. In one aspect, the vehicle may be designed to have a gross vehicle weight of at least 6000 pounds. In another aspect, the rating may be at least 8000 pounds but less than approximately 10000 pounds. In a further aspect, the rating may be between approximately 6000 and 10000 pounds.

Figure 1A:
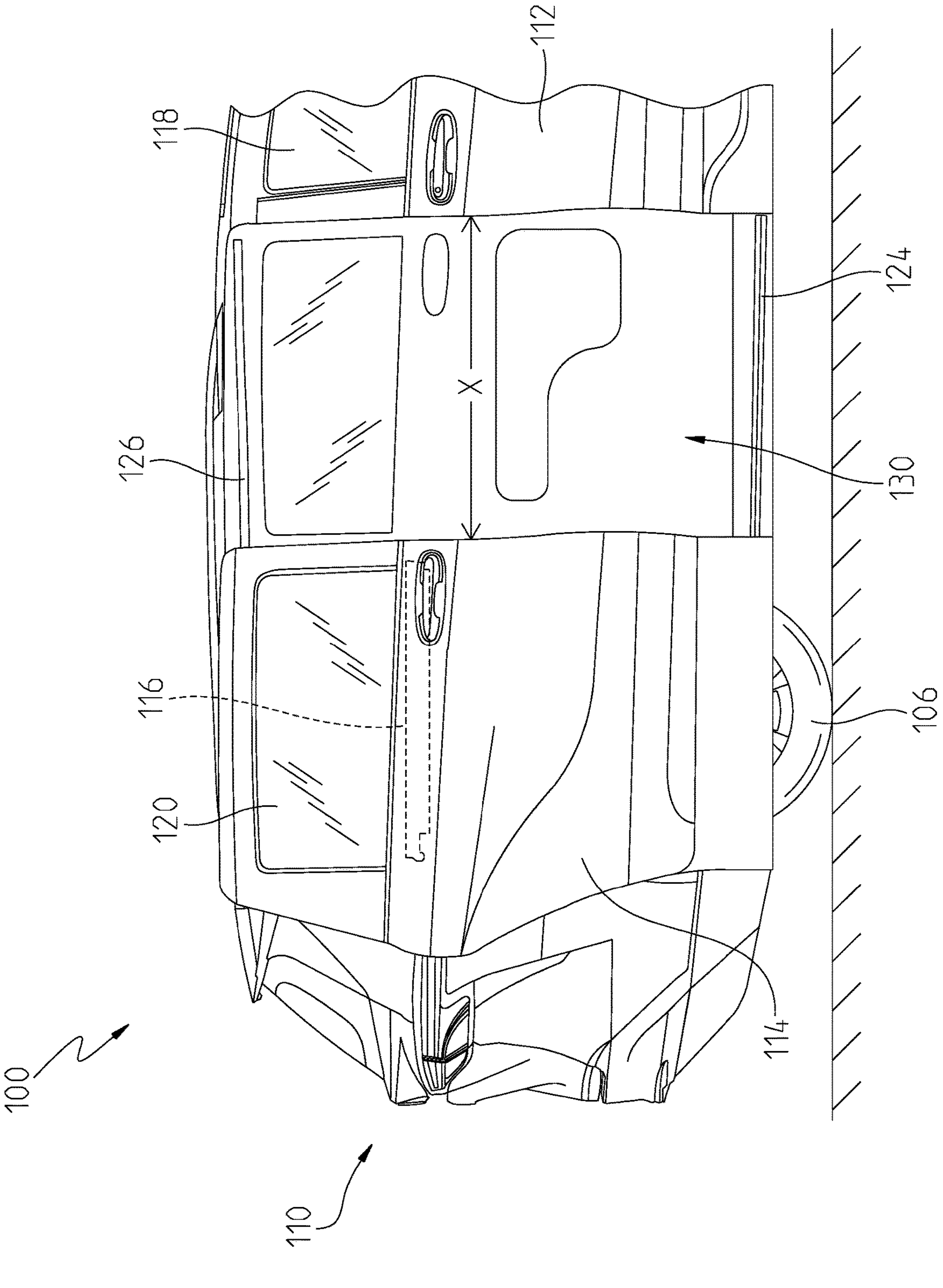
FIG. 1A is a partial side view of the motorized vehicle of FIG. 1.

As shown, the vehicle 100 includes a front end 108 and a rear end 110. A conventional driver's seat and front passenger seat (not shown) are generally located towards the front end 108 of the vehicle 100, whereas a rear passenger seat (not shown) is generally located towards the rear end 110 of the vehicle. More specifically, as shown in the embodiment of FIG. 1A, the vehicle 100 may include an interior 130 that comprises a front interior portion and a rear interior portion. In several embodiments, the driver's seat and front passenger seat may be located in the front interior portion, and at least one rear passenger seat may be located in the rear interior portion of the vehicle 100.

In some embodiments, the vehicle 100 may include a first or front passenger side door 112 located between the front wheels 104 and rear wheels 106 and provides access to a passenger for sitting in a front passenger seat (not shown) of the vehicle 100 adjacent to the driver. In this position, the passenger has a clear forward view of the road when compared to sitting in the rear passenger seat of the vehicle 100. Moreover, when seated, the passenger may be facing in a forward direction of travel. Further, in the illustrated embodiment of FIG. 1, the vehicle 100 may include a second or rear passenger side door 114 coupled to the unibody frame 102.

In some embodiments, the first door 112 and second door 114 may be hingedly coupled to the frame 102 of the vehicle 100. In other embodiments, at least the second door 114 may be slidably coupled to the frame 102. In FIGS. 1 and 1A, the second door 114 is capable of being moved along a direction indicated by arrow 128 between an open position (FIG. 1A) and a closed position (FIG. 1). A user may grasp and manipulate a door handle to manually move the door 114 between the open and closed positions. In further embodiments, a key fob or other electrical control device (not shown) may send an electrical signal to a controller for moving the door 114 between its open and closed positions.

As shown in FIG. 1, the first door 112 may include a first window 118 and the second door 114 may include a second window 120. In some embodiments, at a location rearward of the second door 114 may be a third window 122.

In one embodiment, the second door 114 of the vehicle in FIG. 1 is slidably coupled to the frame 102 of the vehicle 100. The frame 102 may include one or more tracks upon which the door is in a sliding engagement with as it moves between the open and closed positions. For example, in FIGS. 1 and 1A, the vehicle frame 102 may include a first track 116, a second track 124, and a third track 126. The first track 116 may be located between the second track 124 and third track 126, as shown. Specifically, in some embodiments, the first track 126 may be referred to as a "center track" or "middle track" when described relative to the second and third tracks. In further embodiments, the second track 124 may be referred to as a "lower track" and the third track 126 may be referred to as an "upper track." In these embodiments, the first, second and third tracks are described relative to their location to one another.

In some embodiments, the first track 116 may be partially defined at a location rearward of a door opening (defined by distance, x, in FIG. 1A) formed when the second door 114 is in its open position. In other embodiments, the first track 116 may be located partially below the third window 122.

In one embodiment, the first track 116, second track 124 and third track 126 may be adapted to receive a slider or other mechanism coupled to the second door 114. In another embodiment, the second door 114 may include one or more mechanisms or sliders coupled thereto for being in sliding engagement with the one or more tracks formed by the vehicle frame 102. Each mechanism or slider may be disposed within a respective track to enable the door 114 to move between its open and closed positions.

In some embodiments, a vehicle door such as the second door 114 in FIG. 1 may slide rearwardly to a fully open position and which exposes a door opening defined between an edge of the door and a B pillar of the vehicle frame 102. In one of these embodiments, the door opening may be conventionally sized to allow one or more passengers to enter or exit as desired. However, the conventional size opening may not be large enough to accommodate a ramp which may be used by a physically limited passenger. Moreover, the conventional size opening may not be large enough to allow a wheelchair to pass through the opening. Thus, particularly for motorized vehicles equipped to transport a physically limited passenger or a wheelchair, there is a need to increase the door opening size beyond the conventional OEM size.

Figure 3:
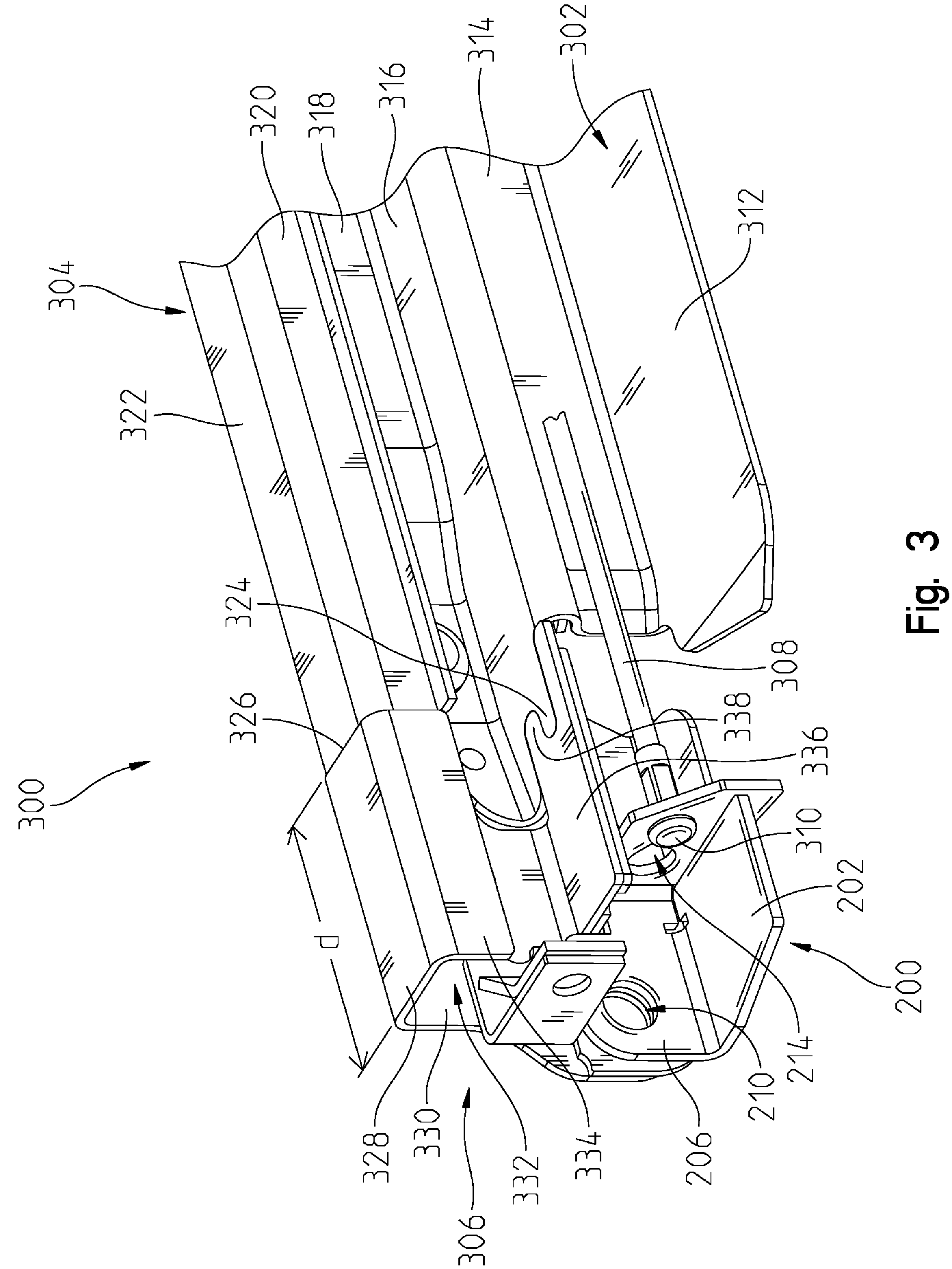
FIG. 3 is a perspective view of a modified door track assembly for a motorized vehicle.

Referring to FIG. 3 of the present disclosure, one embodiment of a modified track assembly 300 is shown. In this embodiment, the modified track assembly 300 includes a portion of the OEM or original track assembly as well as a modified portion. In a first embodiment, the track assembly 300 may be the first track assembly 116. In a second embodiment, the track assembly 300 may be the second track assembly 124. In a third embodiment, the track assembly 300 may be the third track assembly 126. In a further embodiment, the track assembly 300 may be any one of a plurality of track assemblies formed in a body or frame of a motorized vehicle to accommodate a sliding or at least partially sliding door.

In the illustrated embodiment, the track assembly 300 may include a first track portion 302, a second track portion 304, a third track or extension portion 306, and a bracket 200. The first track portion 302 may be a part or portion of an OEM track assembly. The first track portion 302 may include a first surface 312, a first wall 314, a first track surface 316, and a second wall 318. In some embodiments, the first surface 312 and first track surface 316 may be at least partially parallel to one another. In other embodiments, the first wall 314 and second wall 318 may be partially parallel to one another. In further embodiments, the first surface 312, first wall 314, first track surface 316, and second wall 318 may be integrally formed with one another to form the first track portion 302.

In one embodiment, the second track portion 304 may be a part of the OEM track assembly or any other conventional track assembly which is modified or converted into the track assembly 300 shown in FIG. 3. In another embodiment, the second track portion 304 may be a separate portion of the track assembly 300 which is modified. In any event, the second track portion 304 may include a first wall 320 and an upper surface 322. In one embodiment, the first wall 320 is integrally formed with the upper surface 322. In another embodiment, the first wall 320 may be approximately parallel with the first wall 314 of the first track portion 302. In a further embodiment, the upper surface 320 may be approximately parallel to the first track surface 316.

In another embodiment of FIG. 3, the first track portion 302 and second track portion 304 may be coupled to one another. In one example, the first track portion 302 may be welded to the second track portion 304. In another example, the first track portion 302 may be adhered to the second track portion 304. In a further example, the first track portion 302 may be fastened to the second track portion 304 via one or more fasteners. In yet a further embodiment, the first and second track portions may not be coupled to one another.

The illustrated embodiment of FIG. 3 may include a third track portion 306. The third track portion 306 may also be referred to as an extension portion as the third track portion 306 is adapted to provide additional door travel so that the door opening size of the motorized vehicle can be increased. Specifically, the third track portion 306 may allow for additional rearward travel of the vehicle door such that a width of the door opening is increased so that a physically limited passenger may enter or exit more easily. The increased width may also allow a wheelchair ramp to be more easily coupled to the vehicle to allow a wheelchair to enter and exit the vehicle.

In one embodiment, the door opening width may increase by up to 12". In another embodiment, the door opening width may increase by up to 9". In a further embodiment, the door opening width may increase by up to 6". In yet a further embodiment, the door opening width may increase by up to 4". In still another embodiment, the door opening width may increase by up to 3". In a further embodiment, the door opening width may increase by at least 3". In another embodiment, the door opening width may increase by at least 1".

The third track portion 306 may be coupled to the first track portion 302 and/or the second track portion 304 by any known means. First example, in one embodiment, the third track portion 306 may be coupled to the second track portion 304 via welding. In FIG. 3, for example, a weld 326 is depicted indicating the manner in which the third track member 306 and second track member 304 may be coupled. In another embodiment, the third track member 306 may be adhered to the second track portion 304. In yet another embodiment, the third track member 306 may be coupled to the second track portion 304 via one or more fasteners.

The third track portion 306 may be coupled to the first track portion 302 in any number of ways including via welding, adhesive, fasteners, etc. In FIG. 3, the third track portion 306 may include a second track surface 336. The second track surface 336 may form a plane that is aligned with the first track surface 316. In other words, in one embodiment, the first track surface 316 and second track surface 336 may be coplanar. Moreover, the first track portion 302 may include a first finger or member 324 formed in the first track surface 316, and the third track portion 306 may include a second finger or member 338 formed in the second track surface 338. Further yet, in the embodiment shown in FIG. 4, the second track surface 336 may define a third finger or member 406. The second member 338 and third member 406 may define an opening or groove 408 therebetween. When the first track portion 302 and third track portion 306 are coupled to one another, the first member 324 may be slid or otherwise disposed within the opening 408 formed in the third track portion 306. This connection is one example of how the first and third track portions may be coupled. In one embodiment, this connection may be similar to a tongue-in-groove connection. In another arrangement, the first track portion 302 may also form an opening or groove 502 in the first track surface 316 in which the second member 338 may be disposed. This is further shown in FIG. 5 of the present disclosure. The aforementioned first member 324, second member 338, and third member 406 may be formed of any size or shape. The term "finger" is not intended to be limiting nor suggest a type of shape formed by each member. Similarly, the aforementioned openings or grooves are not intended to be limited to any size or shape. A "groove" is but one example of the shape the openings may form. In one embodiment, each member or opening may be referred to as a register member such that one register member of the first track portion 302 may be registered with another register member of the third track portion 306.

In one embodiment, the first finger 326 and second finger 338 may be snapped into engagement with the respective grooves. In another embodiment, the first finger 326 and second finger 338 may be positioned within the respective grooves and adhesive or welding may be used to further bolster the connection.

Figure 5:
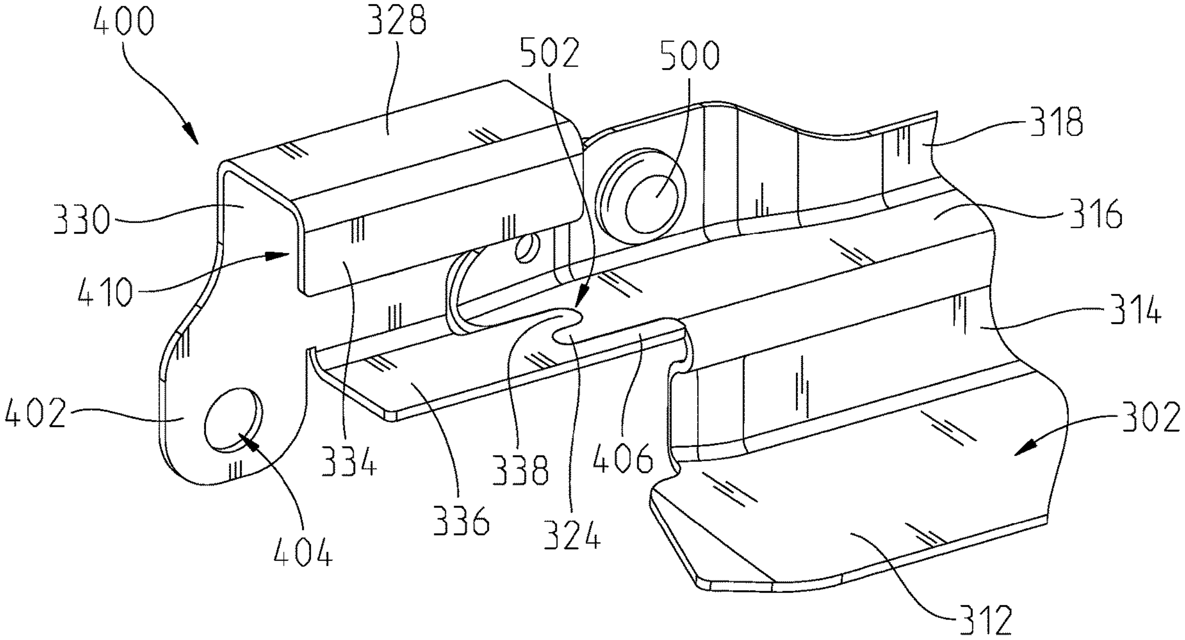
FIG. 5 is a front perspective view of a portion of the track assembly of FIG. 3.
Figure 6:
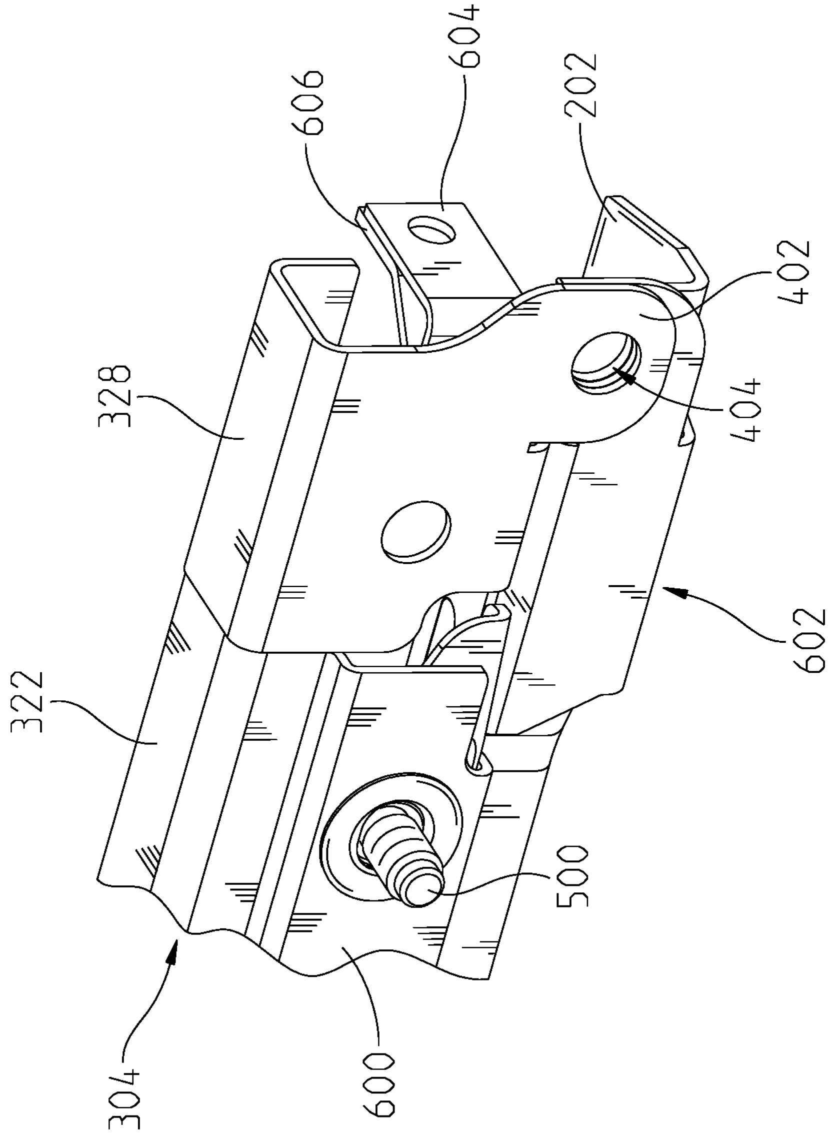
FIG. 6 is a rear perspective view of the portion of the track assembly of FIG. 5.

In FIGS. 5 and 6, the first track portion 302 is shown having an opening formed therein through which a fastener 500 such as a screw, bolt, nail, etc. may be used for coupling the first track portion 302 to the vehicle. In FIG. 6, for example, the fastener 500 is shown protruding through beyond a rear wall 600 of the first track portion 302.

Figure 4:
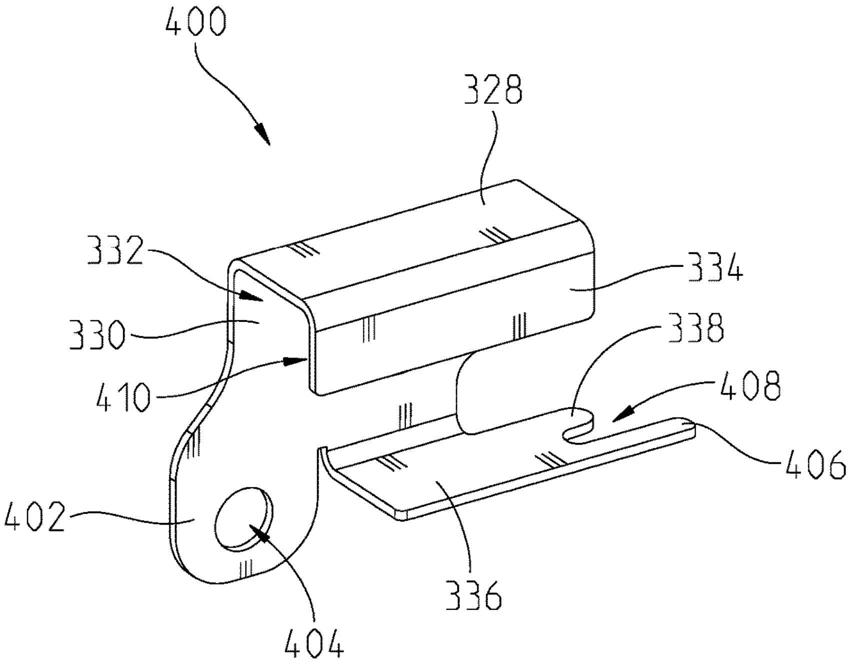
FIG. 4 is a perspective view of a first track extension portion of the track assembly of FIG. 3.

In the embodiments of FIGS. 3, 4, 6 and 7, the third track portion 306 may be formed by a pair of track extension portions. For example, in FIGS. 4 and 6, the third track portion 306 may include a first track extension portion 400 and a second track extension portion 602. The first track extension portion 400 may include a top wall 328, a first inner wall 330 and a first outer wall 334. The first outer wall 334 further defines an inner track wall 410 as shown in FIG. 4. The top wall 328, first inner wall 330 and first outer wall 334 may define a channel 332. As will be described, the door may include a door travel system having one or more wheels or rollers which may pass through the channel 332 between an open and closed positions.

Figure 7:
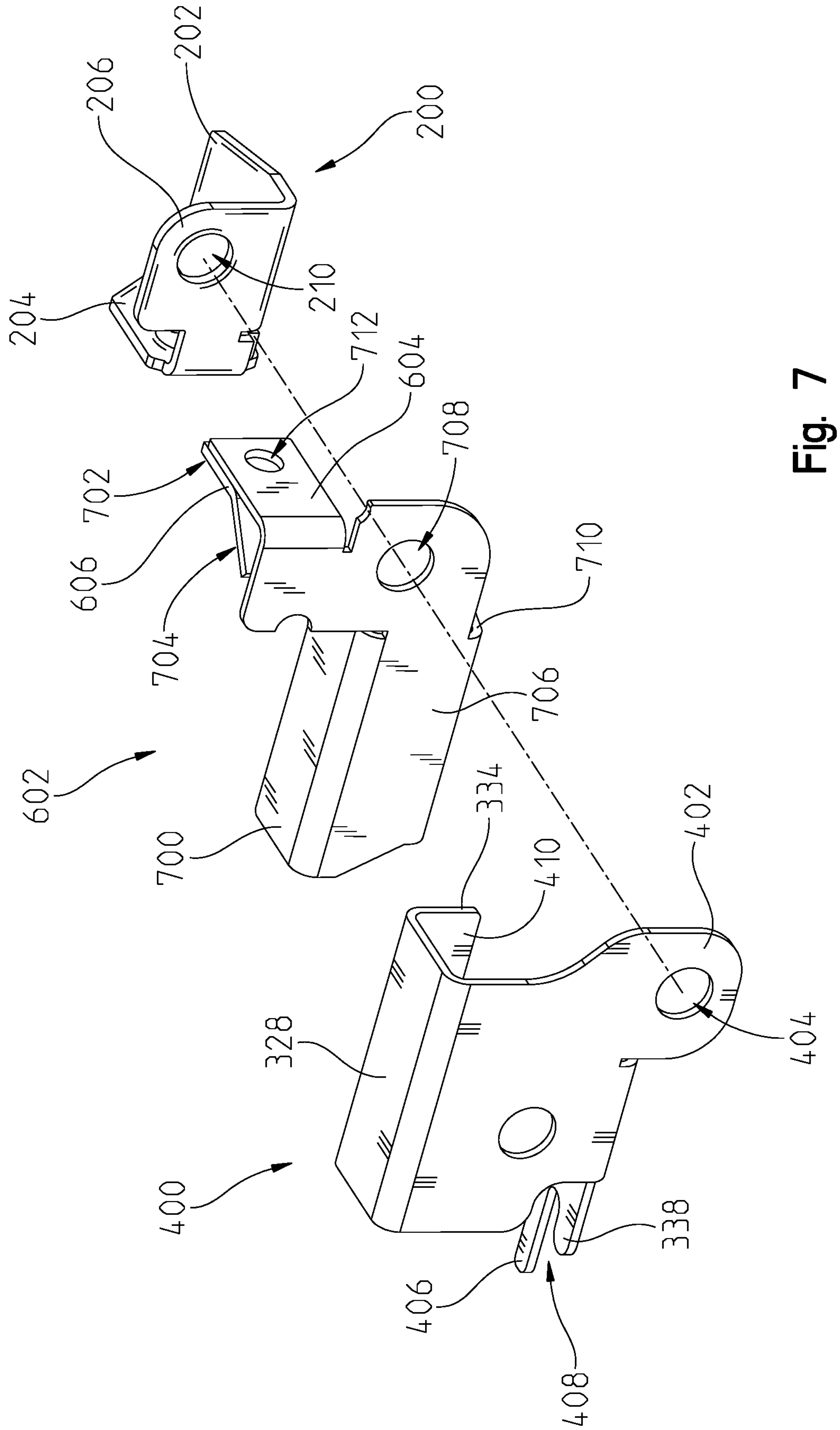
FIG. 7 is an exploded view of the bracket of FIG. 2, first track extension portion of FIG. 4, and a second track extension portion.

In the illustrated embodiment of FIG. 4, the first track extension portion 400 may also include an ear portion 402 which defines an opening 404 for receiving a fastener. The opening 404 may be aligned with a corresponding opening 708 (FIG. 7) defined in the second track extension portion 602. As shown in FIGS. 6 and 7, the second track extension portion 602 may include an outer wall 706, a support structure 700, a bottom wall 710 and a bracket assembly 604. The bracket assembly 604 may include an angled bracket 606, as shown in FIG. 6. In particular, in one embodiment, the bracket assembly 604 may include a first bracket portion 702 and a second bracket portion 704. The first and second bracket portions may be angled relative to one another by less than 180°. In one example, the angle between the first bracket portion 702 and the second bracket portion 704 may be between approximately 90° and 180°. In one embodiment of the present disclosure, the bracket assembly 604 may form a stopper for limiting a rearward travel of the door as it moves to its fully open and extended position. An opening 712 may be formed in the bracket assembly 604 for coupling the angled bracket 606 thereto.

In one embodiment, the support structure 700 may be positioned below the second track surface 336 of the third track portion 306. In this arrangement, the support structure 700 is adapted to support the second track surface 336.

Figure 2:
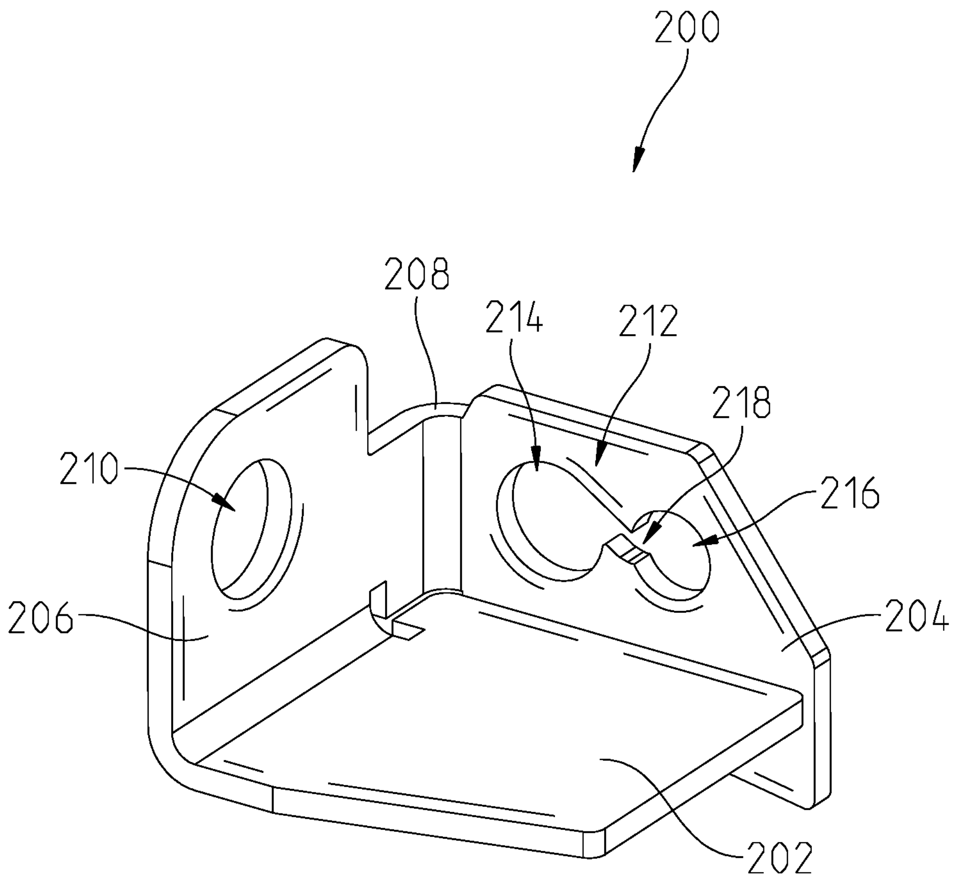
FIG. 2 is a perspective view of a bracket of a door track assembly.

In FIGS. 2, 3 and 7, the bracket 200 is shown. The bracket 200 may be formed by a plurality of walls or structures. In FIG. 2, for example, the bracket 200 may include a first wall or portion 202, a second wall or portion 204, and a third wall or portion 206. The various walls or portions may be integrally formed with one another. The second wall 204 may be coupled to the third wall 206, for example, via a curved wall 208.

In one embodiment, the third wall or portion 206 may define an opening 210 therein. As shown in FIG. 7, the opening 210 in the bracket 200 may be aligned with the opening 404 in the first track extension portion 400 and the opening 708 in the second track extension portion 602. A fastener (not shown), for example, may be used for coupling the bracket 200 to the third track portion 306.

In one embodiment, the bracket 200 may form a door cable retention mechanism 212 in the second wall or portion 204. In this embodiment, the mechanism 212 may take the form of a first opening 214 and a second opening 216. In one embodiment, the first opening 214 may have a larger radius than the second opening 216. In another embodiment, the first opening 214 may be at least twice as large as the second opening 216. In a further embodiment, the first opening 214 may be at least 1.5 times bigger than the second opening 216.

In the illustrated embodiment, a slot 218 may be disposed between the first opening 214 and second opening 216. The slot 218 may be smaller than both the first and second openings. In FIG. 3, a cable 308 is shown having a cable end 310. The cable 308 may be configured to drive the door (not shown) between its open and closed positions. In this embodiment, the cable end 310 may be disposed within the second opening 216. The cable end 310 may be larger than the second opening 216 so it does not slide through. In other words, the second opening 216 is sized such that it is smaller than the end cable end 310, and thereby the cable retention mechanism 212 is able to retain the cable 308 in the second opening 216.

In one embodiment, the second opening 216 is smaller than the cable end 310, the cable end 310 is first inserted through the first opening 214 which is larger than the cable end 310. As the cable end 310 passes through the first opening 214, the cable end 310 and cable 308 may be moved through the slot 218 until the cable 308 is located in the second opening 216. The cable end 310 may be released as it is larger than the second opening 216. As such, the cable 308 may be retained in the bracket 200. In one embodiment, during an assembly process, a plug (not shown) may be disposed within the first opening 214 or slot 218 to prevent the cable 208 from moving out of the second opening 216. In another embodiment, material may be inserted into the slot 218 to prevent the cable 308 from moving out of the second opening 216. In yet another embodiment, material may be inserted into the first opening 214 and the slot 218 to prevent the cable 308 from moving out of the second opening 216.

In one embodiment, the OEM cable may be reused with the modified track assembly 300. In another embodiment, a different or modified cable may be used. In at least one embodiment, a cable with a longer length may be used to accommodate the increased door travel. In a different embodiment, the OEM cable may be long enough to accommodate the increased door travel.

Figure 8:
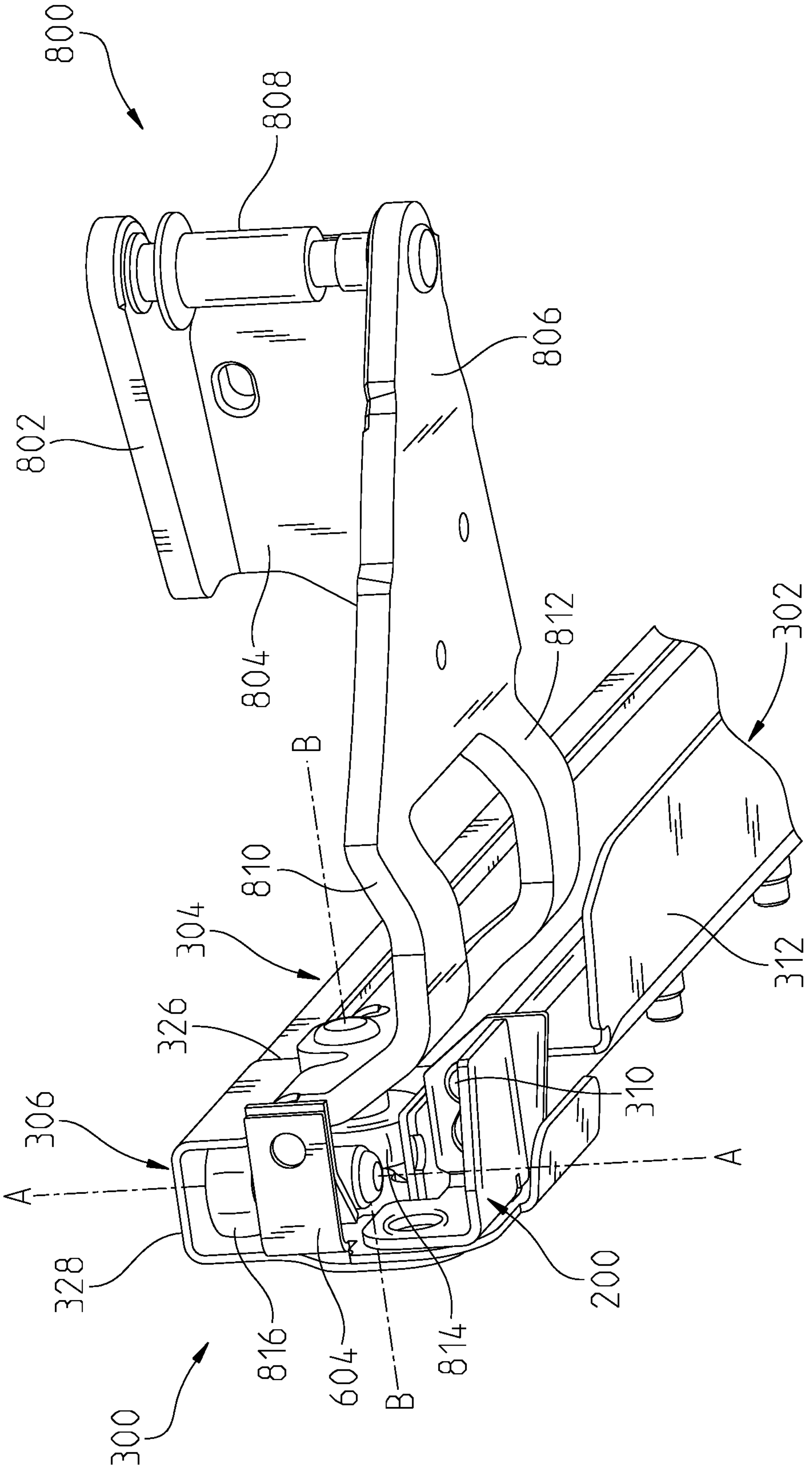
FIG. 8 is a bottom perspective view of the modified door track assembly of FIG. 3 and a portion of a door mechanism assembly.

Referring now to FIG. 8, one embodiment of a door mechanism assembly 800 is illustrated with the track assembly 300. The door mechanism assembly 800 may be mounted to the vehicle door and travels along the track assembly 300 as the door moves between its open and closed positions. The door mechanism assembly 800 may include a upper flange 802, a body coupler 804, and an arm 806. The arm 806 may include a first leg 810 and a second leg 812, as shown in FIG. 8. A spindle 808 may further coupled to the door (not shown). Moreover, the spindle 808 may be located and coupled between the upper flange 802 and arm 806. In at least one embodiment, the upper flange 802, body coupler 804, and arm 806 may be integrally formed with one another. In other embodiments, the upper flange 802, body coupler 804 and arm 806 may be removably coupled to one another.

In the illustrated embodiment of FIG. 8, the door mechanism assembly 800 may include a plurality of wheels or rollers for moving along the track surfaces of the track assembly 300. As shown, the door mechanism assembly 800 may include a first wheel 814 and a second wheel 816. In other embodiments, the door mechanism assembly 800 may include one or more wheels in addition to the first and second wheels. In one embodiment, the first wheel 814 may rotate about a first rotational axis defined along axis B-B. The second wheel 816 may rotate about a second rotational axis defined along axis A-A. In some embodiments, the first rotational axis and second rotational axis may be perpendicular to one another. In other embodiments, the first rotational axis and second rotational axis may be angled relative to one another.

In one embodiment, the first wheel 814 may be configured to roll along the first track surface 316 and the second track surface 336. In doing so, the first wheel 814 is adapted to travel through the channel 332. In another embodiment, the second wheel 816 may also travel through the channel 332. The second wheel 816 may rotate and move along the inner track walls 330, 410 of the track assembly 300. In a further embodiment, a third wheel (not shown) may travel along the inner track walls 330, 410 along the same path as the second wheel 816.

In one embodiment of the present disclosure, the track assembly 300 may comprise the center or middle track assembly of a motorized vehicle. The track assembly 300 may be partially located below the rearmost side window 122 of the vehicle, as shown in FIGS. 1 and 1A. In particular, in one aspect, the third track portion 306 may be entirely disposed below the rearmost side window, whereas the remainder of the track assembly 300 is formed by the OEM track assembly.

Figure 9:
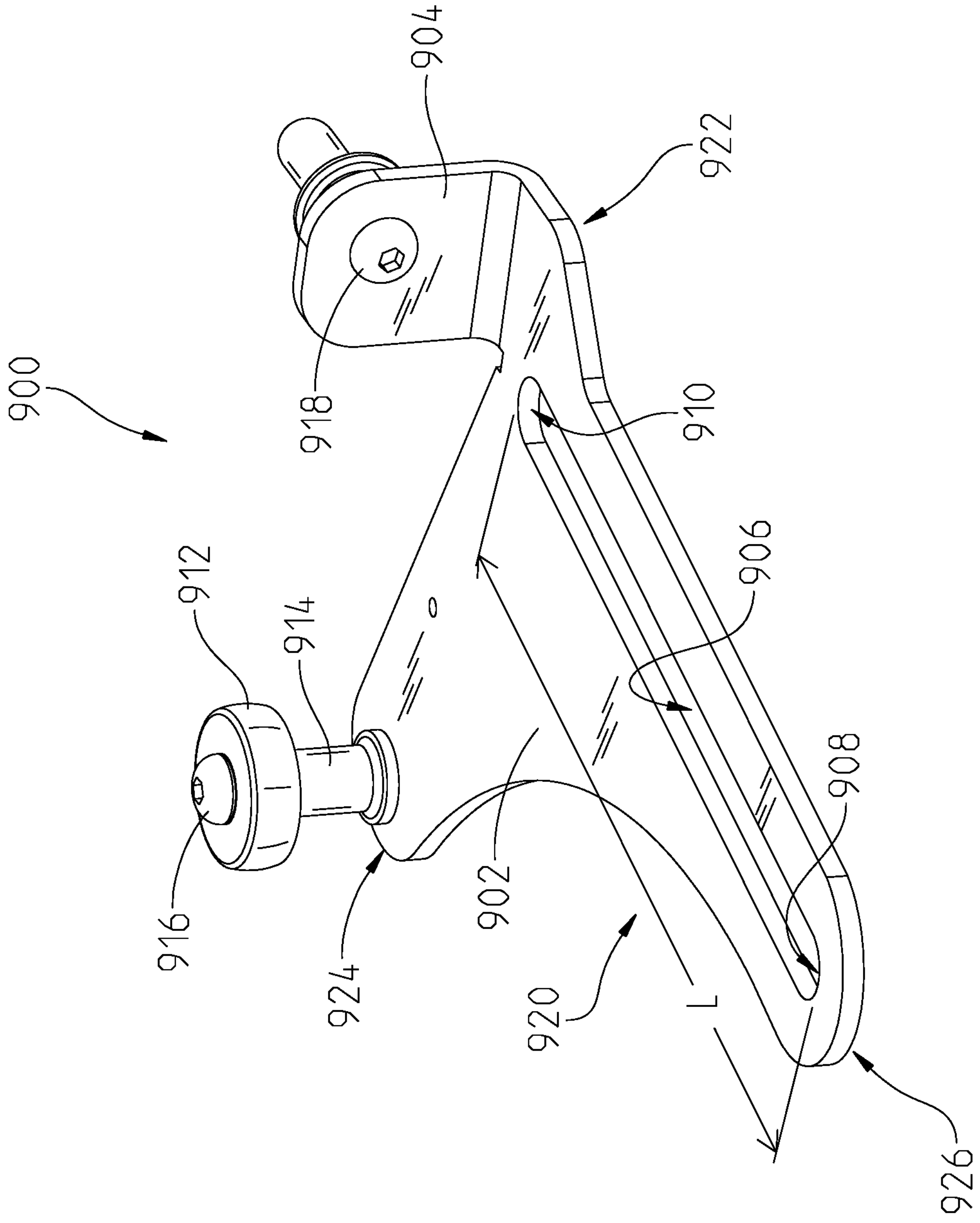
FIG. 9 is a perspective view of a slider mechanism for a sliding door of a motorized vehicle.
Figure 10:
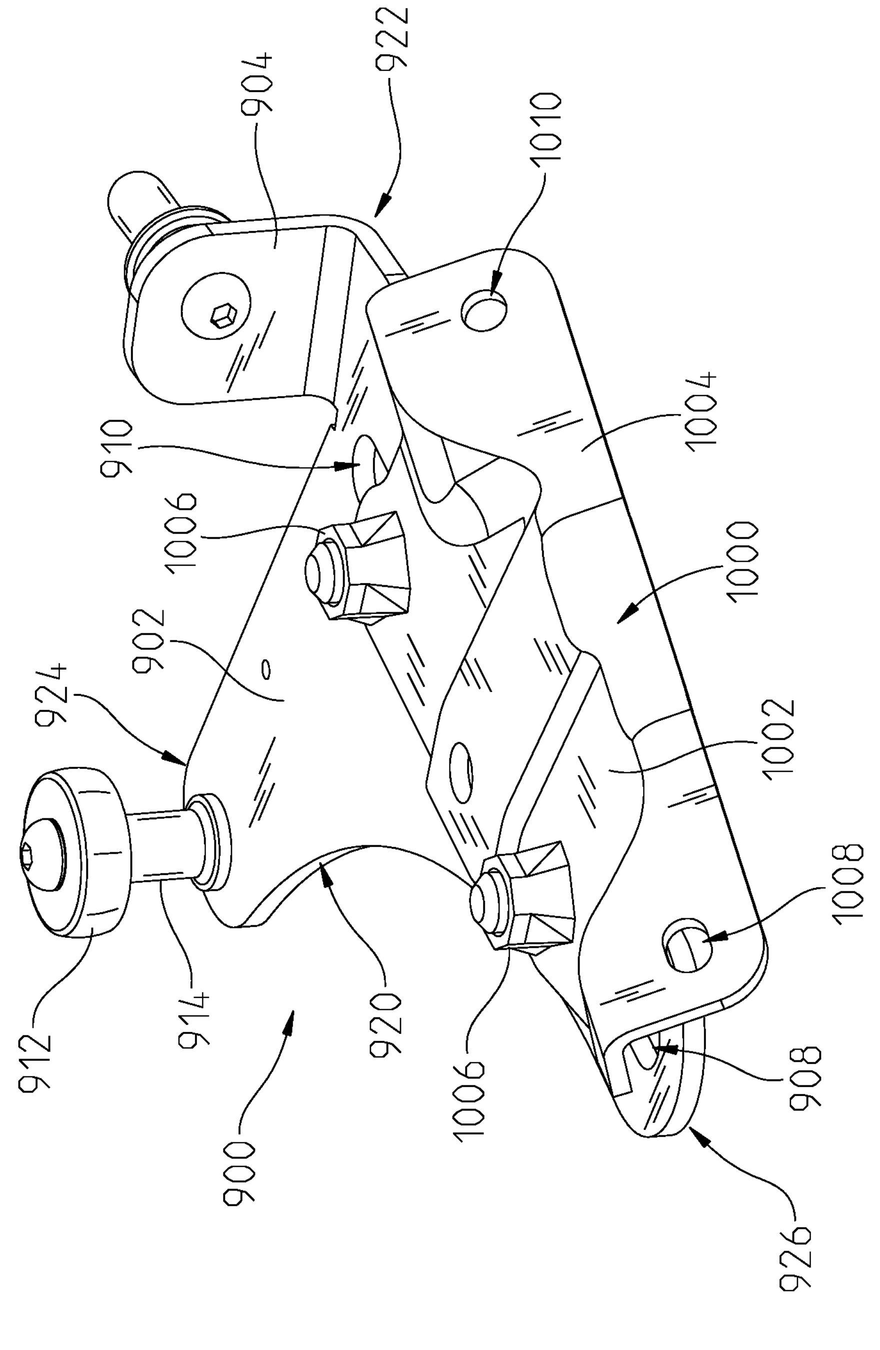
FIG. 10 is a perspective view of an assembly of the slider mechanism of FIG. 9 and a door mount assembly.

Referring now to FIGS. 9-11, an embodiment of a different track system on a motorized vehicle is disclosed. Here, a door mechanism assembly is disclosed which may travel along the track system of the vehicle. For instance, the track assembly may include the center or middle door track assembly 116, the lower door track assembly 124 or the upper door track assembly 126. In other embodiments, the door mechanism assembly may be used with any door track assembly on a motorized vehicle to enable a vehicle door to slide between a closed position and an open position.

The door mechanism assembly of FIGS. 9-11 is adapted to provide additional rearward travel of the vehicle door to enable a larger door opening to be formed. In one embodiment, the door mechanism assembly may include a slider mechanism 900 (FIG. 9) and a door mount assembly 1000 (FIG. 10). In the illustrated embodiment of FIG. 9, for example, the slider mechanism 900 may include a body portion 902 and a flange portion 904. The flange portion 904 may include a hole or opening through which a fastener 918 may be used for coupling the flange portion 904 to a vehicle door or other structure (not shown). In one embodiment, the flange portion 904 may be integrally coupled with the body portion 902. In another embodiment, the flange portion 904 may be coupled with the body portion 902 in any known way (e.g., welding, adhesive, fastener, etc.). Moreover, in one aspect, the flange portion 904 may be defined in a first plane and the body portion 902 may be defined in a second plane, where the first plane and second plane are substantially perpendicular to one another. In another aspect, the first plane and second plane may be angled relative to one another by less than 90°. In a further aspect, the first plane and second plane may be angled relative to one another by more than 90°.

In one embodiment, the body portion 902 may include at least a first portion 922, a second portion 924, and a third portion 926. In this embodiment, the body portion 902 may have an overall triangular shape to it. In other embodiments, the body portion 902 may include additional ends or portions such that the body portion 902 may be shaped as a rectangle, pentagon, hexagon, octagon, etc. The body portion 902 may have any number of ends or portions in several embodiments of this disclosure.

In one embodiment, the body portion 902 may define a concave 920 surface. In one example, the concave surface 920 may be formed between the second portion 924 and third portion 926. In another example, the concave surface 920 may be formed between any two ends or portions of the body portion 902. In a further example, the surface between the first portion 922 and second portion 924 may be substantially linear. In yet a further example, the surface between the first portion 922 and second portion 924 may be substantially curved (e.g., concave). In a different example, the surface between the first portion 922 and third portion 926 may be substantially linear. In another example, the surface between the first portion 922 and third portion 926 may be partially linear and partially concave.

In one embodiment, the body portion 902 may include a slot 906 defined therein. The slot 906 may have a length, L, defined between a first end 908 and a second end 910. In the illustrated embodiment, the first end 908 of the slot 906 may be located at the third portion 926 of the body portion 902, and the second end 910 of the slot 906 may be located at the first portion 922. In one embodiment, the slot 906 may be substantially linear along its length, L. In another embodiment, the slot 906 may include at least one curved or bent portion along its length, L. In a further embodiment, the slot 906 may include a plurality of curved or bent portions along its length, L. The slot 906 may allow a vehicle door to travel rearward an additional distance to achieve the increased width of the door opening.

In some embodiments, the slider mechanism 900 may include a roller or wheel 912 and a bearing or spindle 914 coupled to the body portion 902. In one such embodiment, the wheel 912 and spindle 914 may be coupled to the second portion 924 of the body portion 902. In another embodiment, the wheel 912 and spindle 914 may be coupled to another end or portion spaced from the first portion 922 and third portion 926. In a further embodiment, the wheel 912 and spindle 914 may be spaced from the slot 906 and flange portion 904.

The wheel 912 and spindle 914 may be removably coupled to the body portion 902 via a fastener 916. Other mechanisms may be used for coupling the wheel 912 and spindle 914 to the body portion 902 so long as the wheel 912 is capable of rotating about the spindle 914.

In FIG. 10, an embodiment of the door mount assembly 1000 is shown. Here, the door mount assembly 1000 is configured to be coupled to an inner surface of the vehicle door (not shown). The door mount assembly 1000 may include a body mount portion 1002 and an interface portion 1004. The interface portion 1004 may be angled relative to the body mount portion 1002. The interface portion 1004 may include a first opening or hole 1008 and a second opening or hole 1010. A pair of fasteners (not shown) may be used for coupling the interface portion 1004 to the vehicle door (not shown) via the pair of openings 1008, 1010.

In one embodiment, the door mount assembly 1000 may be coupled to the slider mechanism 900 via one or more fasteners 1006. In one example, the one or more fasteners 1006 may comprise a pin. The one or more fasteners or pins 1006 may pass through the slot 906 defined in the body portion 902 of the slider mechanism. The one or more fasteners or pins 1006 may slide or otherwise move within the slot 906 between the first end 908 and second end 910 as the door moves between its closed position and open position. In one embodiment, the one or more fasteners or pins 1006 may be disposed at the second end 910 of the slot 906 when the vehicle door is in its closed position. In another embodiment, the one or more fasteners or pins 1006 may be disposed at the first end 908 of the slot 906 when the vehicle door is in its open position.

In at least one embodiment, the one or more fasteners 1006 may include a first pin and a second pin. When the door is in its closed position, the first pin may be located at the second end 910 of the slot 906 and the second pin may be located in the slot 906 at a position between the first and second ends. When the door is in its fully, extended open position, the second pin of the one or more fasteners 1006 may be disposed at the first end 910 of the slot 906, whereas the first pin is located in the slot 906 at a position between the first and second ends.

In a further embodiment, the one or more fasteners 1006 may include a first pin and a second pin. When the door is in its closed position, the first pin may be located at the second end 910 of the slot 906 and the second pin may be located in the slot 906 at a position between the first and second ends. As the door travels towards its fully open position but before it reaches its fully, extended open position, the wheel 912 of the slider mechanism 900 may contact an end stop (not shown) of the track assembly (not shown). In a conventional vehicle door and track assembly such as in an OEM vehicle, the end stop of the track assembly may define the furthest rearward movement of the vehicle door. In other words, once the wheel 912 contacts the end stop, the vehicle door cannot travel rearward any further. In the embodiment of FIGS. 9-11, however, the conventional vehicle door is modified with the slider mechanism 900 and door mount assembly 1000. In this embodiment, once the wheel 912 of the slider mechanism 900 contacts the end stop of the track assembly, the vehicle door may move further rearward as the door mount assembly 1000 slides rearward relative to the slider mechanism 900 until the second pin of the one or more fasteners 1006 engages the first end 908 of the slot 906. This additional rearward movement of the vehicle door may be defined by the distance between the second pin and the first end 908 of the slot 906 when the first pin is located at the second end 910 of the slot 906. This distance may be modified or increased by taking advantage of the entire length, L, of the slot 906 when only a single pin or fastener 1006 moves within the slot 906. Thus, by removing one or more fasteners or pins located within the slot 906 so that only a single pin 1006 is coupled between the slider mechanism 900 and door mount assembly 1000 within the slot 906, additional rearward travel of the vehicle door may be possible.

Figure 11A:
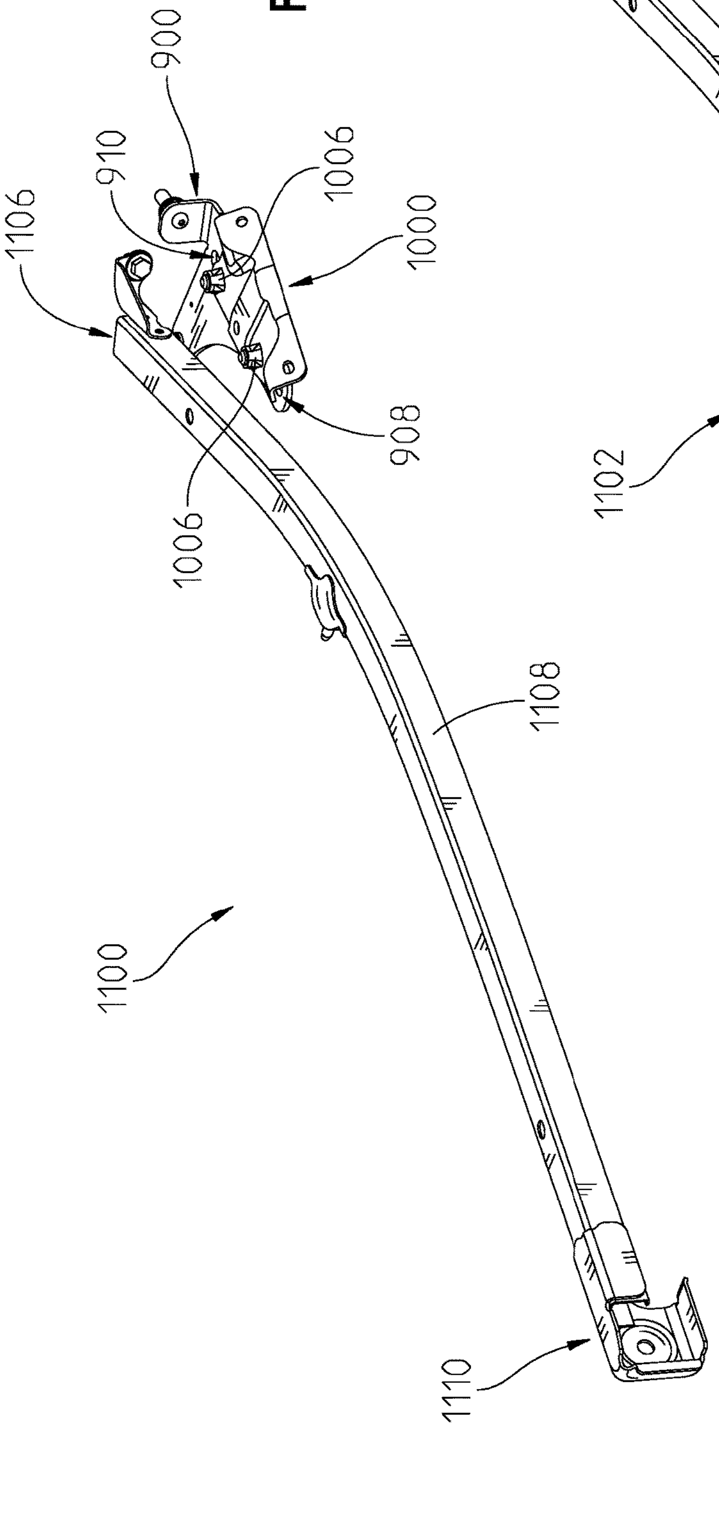
FIGS. 11A-C are perspective views of the assembly of FIG. 10 at different locations along a track assembly of a motorized vehicle.

In FIG. 11A, one embodiment of the slider mechanism 900 and door mount assembly 1000 is shown coupled to a vehicle door track. The vehicle door track may be the upper door track 126, the lower door track 124, or the center or middle door track 116 or any combination thereof. In one embodiment, the door track assembly 300 of FIG. 3 may be located in the center or middle door track 116, whereas the slider mechanism 900 and door mount assembly 1000 may be coupled to the upper door track 126 and/or the lower door track 124.

In any event, in FIG. 11A, the slider mechanism 900 and the door mount assembly 1000 are shown with the door in its closed position 1100. The door track 1108 may have a first track end 1106 and a second track end 1110. The vehicle door (not shown) may move or slide in an opening direction 1112 (see FIG. 11C) along the door track 1108 from its closed position 1100 in FIG. 11A to a partially open position 1102 in FIG. 11B to a fully, extended open position 1104 in FIG. 11C. In the embodiment of FIG. 11A, the door mount assembly 1000 may be located at the second end 910 of the slot 906 and thus spaced from the first end 908 thereof. In particular, at least one fastener or pin 1006 may be located at or near the second end 910.

Figure 11B:
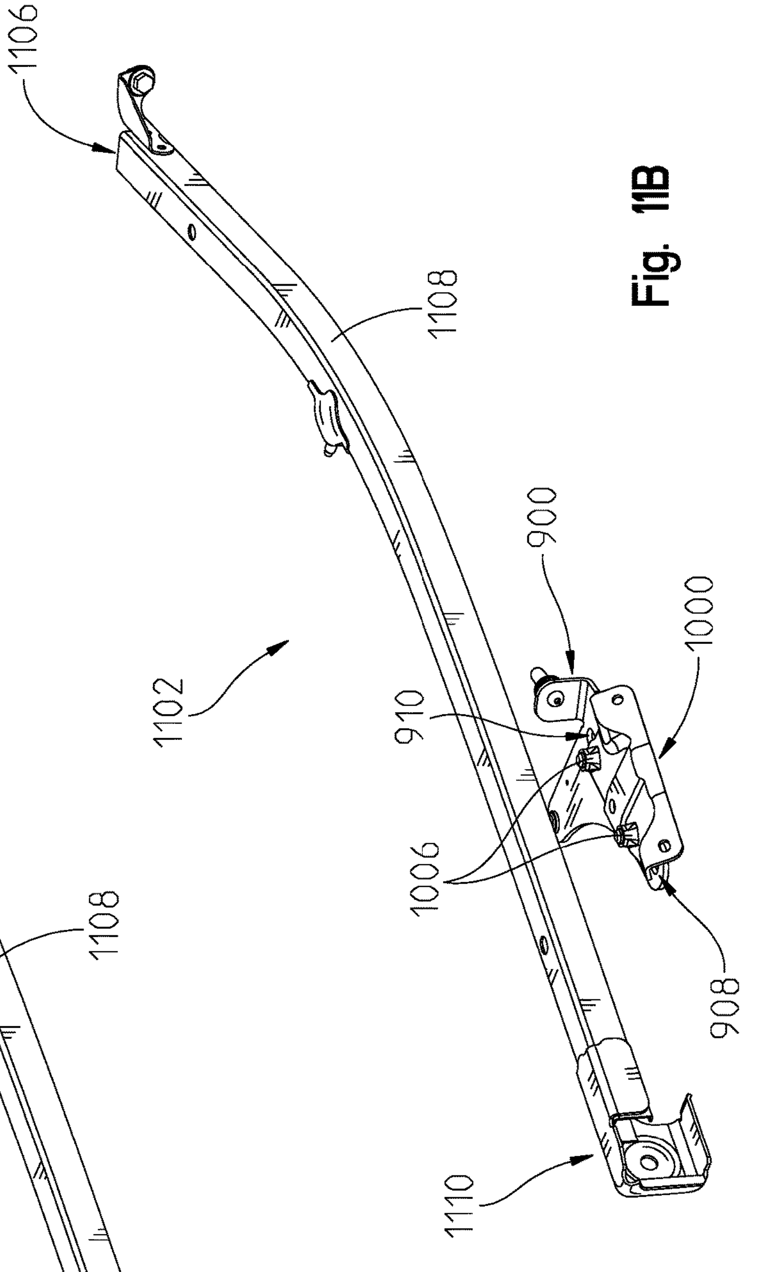

In FIG. 11B, the door may be located between the closed position and its fully, extended open position, i.e., in a partially open position 1102. Here, the door mount assembly 1000 may be located in approximately the same position as it is in the closed position 1100 of FIG. 11A. In other words, the door mount assembly 1000 may not travel through the slot until the wheel 912 on the slider mechanism 900 reaches an end of travel stop (not shown) in the door track 1108. In at least one embodiment, the wheel 912 may be in contact with the end stop in FIG. 11B.

Figure 11C:
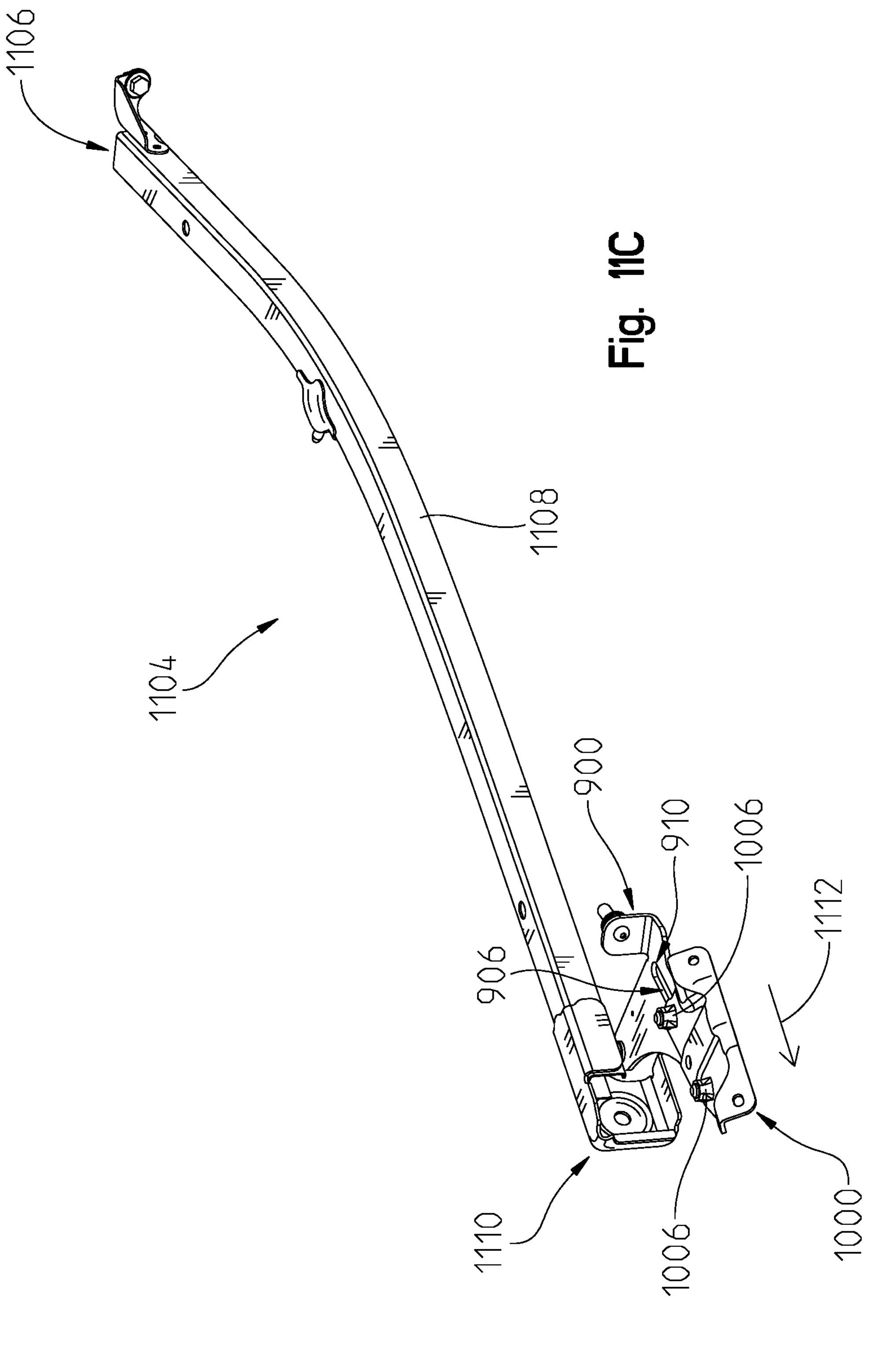

Referring to FIG. 11C, the vehicle door is shown in its fully, extended open position 1104. Here, the door mount assembly 1000 is moved towards the first end 908 of the slot 906 defined in the slider mechanism 900. In particular, one fastener or pin 1006 may engage the first end 908 in this position. In other words, once the wheel 912 engages the end stop of the track 1108, the door mount assembly 1000 (and thus the door to which it is coupled) may continue moving rearward along direction 1112 through the slot 906 until the fastener 1006 or pin contacts the first end 908 of the slot 906.

In one embodiment of the present disclosure, the door mount assembly 1000 of FIGS. 9-11 may travel a first extended distance along the track 1108 based on the location of the fastener or pin 1006 closest to the first end 908 of the slot 906 to enable the vehicle door to have extended rearward travel. In another embodiment, the door mechanism assembly 800 of FIG. 8 may travel a second extended distance along the track assembly 300 of FIG. 3 to enable the vehicle door to have extended rearward travel. In a further embodiment, the first extended distance may be approximately the same as the second extended distance. In a different embodiment, the first extended distance may be greater than the second extended distance. In yet another embodiment, the first extended distance may be less than the second extended distance. In any event, the extended rearward travel of the vehicle door due to the modifications of the track assembly or door mechanism assembly (e.g., slider mechanism 900 and door mount assembly 1000) may allow for an increased width of the door opening.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A door track assembly along which a vehicle door of a motorized vehicle travels between an open position and a closed position, the vehicle door including a door mechanism assembly having a cable and at least one wheel, the door track assembly comprising:

a first track portion defining a first track surface;

a second track portion comprising at least a first wall and a second wall; and a third track portion coupled to the second track portion, the third track portion comprising a top wall, a first side wall, a second side wall, and a lower wall, the lower wall defining a second track surface;

wherein, the first track portion defines at least a first finger and a first groove in the first track surface, and the third track portion defines at least a second finger and a second groove in the second track surface;

wherein, the first finger is disposed within the second groove and the second finger is disposed within the first groove such that the first track surface and second track surface are substantially coplanar.

2. The door track assembly of claim 1, wherein the third track portion comprises a third finger, wherein the first finger is disposed inbetween the second finger and third finger.

3. The door track assembly of claim 1, wherein the third track portion is welded to the second track portion.

4. The door track assembly of claim 3, wherein the top wall is arranged substantially coplanar with the second wall, and the first side wall is arranged substantially coplanar with the first wall.

5. The door track assembly of claim 1, wherein the top wall, the first side wall and second side wall define a channel, where the channel is adapted to receive the at least one wheel.

6. The door track assembly of claim 1, further comprising a bracket coupled to the third track portion, the bracket comprising a first portion, a second portion and a third portion.

7. The door track assembly of claim 6, wherein the first portion is disposed within a first plane, the second portion is disposed within a second plane, and the third portion is disposed within a third plane, where the first plane, second plane and third plane are substantially perpendicular to one another.

8. The door track assembly of claim 6, wherein the second portion defines a first opening, a second opening, and a slot, where the first opening is larger than the second opening, and the slot is located between the first and second openings.

9. The door track assembly of claim 8, wherein the second opening is adapted to receive the cable.

10. The door track assembly of claim 6, wherein:

the bracket defines an opening in the third portion;

the third track portion comprises a first track extension portion and a second track extension portion, the first track extension portion defining a first opening and the second track extension portion defining a second opening, where the first opening, second opening and the opening in the bracket are aligned when coupling the bracket to the third track portion.

11. The door track assembly of claim 10, wherein the second finger and second groove are formed in the first track extension portion.

12. A motorized vehicle, comprising:

a chassis;

a plurality of wheels supporting the chassis;

a plurality of tracks coupled to the chassis, the plurality of tracks including at least a first track assembly and a second track assembly;

a vehicle door coupled to the chassis, the vehicle door adapted to move between a closed position and an open position, wherein the vehicle door comprises a first door mechanism assembly movably coupled to the first track assembly and a second door mechanism assembly movably coupled to the second track assembly;

wherein, the first track assembly comprises a first track portion defining a first track surface, a second track portion, and a third track portion coupled to the second track portion, the third track portion comprising a top wall, a first side wall, a second side wall, and a lower wall, the lower wall defining a second track surface;

wherein, the first track portion defines at least a first finger and a first groove in the first track surface, and the third track portion defines at least a second finger and a second groove in the second track surface;

wherein, the first finger is disposed within the second groove and the second finger is disposed within the first groove such that the first track surface and second track surface are substantially coplanar.

13. The motorized vehicle of claim 12, wherein the second door mechanism assembly comprises:

a slider mechanism comprising a body portion and a wheel, the body portion defining an elongated slot having a length defined between a first end and a second end;

a door mount assembly adapted to being coupled to the vehicle door, the door mount assembly comprising a body mount portion coupled to the slider mechanism; and at least one pin coupling the door mount assembly to the slider mechanism, the at least one pin being disposed within the slot;

wherein, the wheel is configured to being received in and moving along the first track assembly as the vehicle door moves between a closed position and an open position;

wherein, the at least one pin moves to the second end of the slot in the open position.

14. The motorized vehicle of claim 13, wherein, as the vehicle door is moved from its closed position to its open position:

the wheel of the slider mechanism moves along the second track assembly until it reaches a stop, where when the wheel reaches the stop the first door mechanism is located at the end of the first track surface; and upon reaching the stop, the first door mechanism moves along the second track surface and the at least one pin moves within the slot until it contacts the second end.

15. The motorized vehicle of claim 12, wherein the third track portion is welded to the second track portion.

16. The motorized vehicle of claim 12, further comprising a bracket coupled to the third track portion, the bracket comprising a first portion, a second portion and a third portion;

wherein the second portion defines a first opening, a second opening, and a slot, where the first opening is larger than the second opening, and the slot is located between the first and second openings;

wherein the second opening is adapted to receive an end of a cable coupled to the vehicle door.

* * * * *